US006991839B2

(12) United States Patent
Maier

(10) Patent No.: US 6,991,839 B2
(45) Date of Patent: Jan. 31, 2006

(54) PRESENTATION FOLDER FORMED FROM A LAMINATE AND PROCESS OF USING SAME

(75) Inventor: Michael C. Maier, Carthage, MO (US)

(73) Assignee: Ward/Kraft, Inc., Ft. Scott, KS (US)

( * ) Notice: Subject to any disclaimer, the term of this patent is extended or adjusted under 35 U.S.C. 154(b) by 0 days.

(21) Appl. No.: 10/850,419

(22) Filed: May 20, 2004

(65) Prior Publication Data

US 2005/0261117 A1 Nov. 24, 2005

(51) Int. Cl.
*B32B 33/00* (2006.01)

(52) U.S. Cl. ....................... 428/40.1; 428/43; 493/210; 493/194; 493/203; 493/223; 493/264

(58) Field of Classification Search ................ 493/194, 493/199, 203, 210, 223, 228, 230, 264; 428/40.1, 428/42.2, 42.3, 43, 192, 194; 206/311, 312, 206/232, 484; 283/98, 100, 101, 107; 281/15.1, 281/29, 31, 45; 229/67.1–67.4

See application file for complete search history.

(56) References Cited

U.S. PATENT DOCUMENTS

| | | | | |
|---|---|---|---|---|
| 3,870,223 A | | 3/1975 | Wyant | |
| 4,109,850 A | | 8/1978 | Meenan et al. | |
| 4,301,962 A | | 11/1981 | Monckton et al. | |
| 4,731,142 A | | 3/1988 | Stenner | |
| 4,850,731 A | * | 7/1989 | Youngs | 206/308.1 |
| 4,863,093 A | * | 9/1989 | DuCorday | 229/67.4 |
| 4,953,780 A | * | 9/1990 | Ross | 229/92.8 |
| 4,989,777 A | | 2/1991 | Miller | |
| 5,269,084 A | * | 12/1993 | Best et al. | 40/773 |
| 5,284,689 A | * | 2/1994 | Laurash et al. | 428/41.6 |
| 5,403,236 A | * | 4/1995 | Greig | 462/6 |
| 5,439,436 A | | 8/1995 | Moll | |
| 5,447,333 A | * | 9/1995 | Kuhns et al. | 281/29 |
| 5,836,507 A | | 11/1998 | Mueller et al. | |
| 5,857,706 A | * | 1/1999 | McQueeny | 281/29 |
| 5,882,038 A | | 3/1999 | Ong | |
| 5,943,800 A | * | 8/1999 | Rose | 40/124.08 |
| 6,001,209 A | * | 12/1999 | Popat et al. | 156/249 |
| 6,063,226 A | | 5/2000 | Foster et al. | |
| 6,092,841 A | * | 7/2000 | Best et al. | 283/56 |
| 6,126,201 A | * | 10/2000 | Pace et al. | 281/29 |
| 6,382,676 B1 | * | 5/2002 | Cochran et al. | 283/51 |
| 6,718,676 B2 | * | 4/2004 | Miska | 40/789 |
| 6,730,396 B2 | * | 5/2004 | Maloney | 428/343 |
| 6,796,424 B2 | * | 9/2004 | Exline | 206/232 |
| 6,845,865 B2 | * | 1/2005 | Wynalda et al. | 206/308.1 |

* cited by examiner

*Primary Examiner*—Stephen F. Gerrity
*Assistant Examiner*—Hemant M. Desai
(74) *Attorney, Agent, or Firm*—Michael C. Maier

(57) ABSTRACT

A generally planar laminate used in forming a personalized presentation folder is provided. The laminate includes one or more patterns of adhesive and one or more die cuts or lines of weakness so as to be able to create one or more pockets and other variable configurations for an individual folder. The laminate of the present invention can be processed through a non-impact printer and may be selectively configured or tailored to meet the needs of the individual user or recipient.

17 Claims, 10 Drawing Sheets

PRESENTATION FOLDER FORMED FROM A LAMINATE AND PROCESS OF USING SAME

CROSS-REFERENCES TO RELATED APPLICATIONS

None.

FIELD OF THE INVENTION

The present invention relates to a laminate that is suitable for use in creating personalized "on demand" presentation folders. More particularly, the instant invention provides the small office, home office user ("SOHO"), as well as the manufacturer of presentation folders and the presenter of products, services and educational subjects with the ability to create personalized presentation folders in limited, individualized quantities. The subject construction of the present specification is provided generally in a planar, laminated form, with one or more patterns of adhesives, in order to create the personalized presentation folder that can be imprinted or imaged with specific or individualized communications or messages in order to create a significantly greater message transmission vehicle for the advancement of product, services, topics, concepts, theories or ideas. The laminate of the present invention is selectively configurable through the use of various die cuts, lines of weakness and score lines such that the presentation folder can be further personalized as needed.

BACKGROUND OF THE INVENTION

Stock folders are generally well known today and are provided in a variety of colors and typically in several standard formats. Such stock products are created from a blank of material to which at least one and usually two pockets are provided on the inner face of the blank. The pockets are generally formed from the same sheet or blank and are then folded over onto the blank and sealed to the blank to create the pockets. The blank is then folded, usually centrally, to form two relatively equal sides.

Such folders are used in a number of applications ranging from academic, such as in a elementary, middle school, high school or collegiate environment to education purposes including seminars and technical symposiums. In addition, folders have also been used in the past to hand out information on products and services in the hopes of inducing purchases or sales of such products or services.

These prior art folders are provided in a broad spectrum of colors and can even have different finishes such as glossy or a metallic appearance in order to supplement the product or topic offering. In addition, such prior art products may also be provided with textural or tactile features so as to resemble grains in leather or wood, again all in an effort to produce or tailor the communication vehicle to the audience or presenter to garner more attention for the products or services being offered.

Examples of such prior art folders include U.S. Pat. Nos. 3,870,223, 4,109,850, 4,301,962, 4,731,142, 4,989,777 and 5,836,507. Each of these prior art constructions are constructed from a single blank of material. That is, the portion making up the folder and which comprises the pocket are part of the same blank. The portion which becomes the pocket is then folded onto the folder portion to create the pocket portion. Such constructions normally require the manufacturer to purchase expensive and complicated folding equipment in order to process and fold the pocket portion, see for example U.S. Pat. Nos. 5,439,436 and 6,063,226. Such equipment generally does not fit within the needs of a traditional forms or labels manufacturer and as such, these manufacturers have heretofore been unable to offer presentation folder products.

One of the difficulties with such stock folder products is that the user of such products must order the folders in large lots, or must select from a generic stock inventory that may only have a pre-determined number of colors or finish options. If a presenter or distributor would prefer to have at least limited information printed on the folder, such as the name of the company or presenter or to have certain colors or finishes that represent the company, such as to emphasize the trade dress, then the user is stuck with the unfortunate option of having to order such products in large quantities typically greater than 50 and more often in the hundreds or thousands as the set up for the production of folders is complex and orders in the hundreds or thousands of units is normally required by the manufacturer due to the complexity associated with such set up of equipment. This dilemma has thwarted the growth of the folder industry and prevented the use of this tool from expanding its communication potential to users of the product.

Attempts at personalization or individualization have sometimes been elaborate, such as that illustrated by U.S. Pat. No. 5,882,038 in which a personalized sheet is printed and then inserted so that the personalized information is then visible through die cut windows in the blank. As one might imagine, this limits the amount of personalization that can be provided and also requires that the information be aligned with the windows in the folder assembly so that it is visible. In addition, to the steps of folding the blank and the equipment required therefore, in order to manufacture such a product one needs to add additional stations and then is faced with the challenge of inserting the personalized sheet of information. In preparing for a meeting, even a small meeting, having to insert 10 sheets into 10 different folders can be time consuming, particularly if one is rushed in trying to get to the meeting.

The foregoing prior art products also suffer from the fact that they are provided only in a relatively few standard configurations, choices of only one or two products having only one or two pockets. This may require the presenter to over stuff the pockets provided with the folder or alternatively to have to distribute multiple folders in order to achieve the communication that is intended, that is in order to discuss multiple products or services multiple folders need to be provided to the attendees of the meeting. In addition, attendees may also wish to include materials collected at the event such as notes, brochures or other collateral material and are faced with stuffing the material into already tight spaces or simply dropping them internally of the folder which can lead to the materials being lost as they are not secured by a pocket. The ability to add additional pockets or the ability to position pockets in different areas of the folder is simply not an option or if it is it may be an expensive option requiring the manufacturer to purchase additional equipment, rework existing equipment or obtain further tooling in order to produce what may only be a single order.

Another problem faced by users of such stock folders is that they have virtually no personalized or individualized information. For example, in a typical introductory business meeting between two entities, the attendees may include an executive, members of sales and marketing and production personnel. Distributing the exact same information to each attendee may result in the information simply being deposited into the attendee's files, instead of the presenter's intent of delivering a specific message to each participant. Any personalized or individualized information is then limited to the sheets that are included inside the folders and those specific to a particular attendee may be buried deep within myriad of pages of information provided to the attendees.

The products that are currently available in today's marketplace thus do not lend themselves readily to individual's need such as may be encountered in connection with a student's science project, report or paper or the like. That is, the student or individual user must still purchase a stock folder add labels and graphics in order to integrate the product into the theme of the project or report.

Publications, patents and patent applications are referred to throughout this disclosure. All references cited herein are hereby incorporated by reference.

What is needed therefore is a presentation folder product that can be readily tailored or adapted to the needs of an individual as well as be manufactured by traditional producers of pressure sensitive laminates and business form products.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention includes a pressure sensitive laminate suitable for use in creating a presentation folder. The construction may be selectively configurable so as to allow end users to individually construct folders or alternatively the configuration may be used by manufacturers of traditional pressure sensitive products to produce presentation folders.

In one exemplary embodiment of the present invention, a laminate for use in creating presentation folders is described and includes a first sheet having a front face and a back face, first and second side edges and first and second end edges, the side edges and the end edges defining a perimeter of the first sheet. The first sheet has at least a first pattern of adhesive disposed substantially adjacent to and extending inwardly of the perimeter of the first sheet front face and the first sheet has an area or internal dimension.

The presently described embodiment also includes a second sheet that has a front face and a back face, first and second side edges and first and second end edges, the side edges and end edges defining a perimeter of the second sheet. The second sheet is substantially coextensive with the first sheet and the second sheet back face is adhesively joined to the first sheet front face by the pattern of adhesive. The second sheet has an area or internal dimension that is substantially equal to the area of the first sheet.

Continuing with a discussion of the presently described embodiment, the laminate includes at least one die cut that extends through the second sheet forming a removable portion that has an area or internal dimension. The area of the removable portion is less than the areas of each of the first and second sheets, but still comprises at least 50% of the area of each of the first and second sheets. The die cut is disposed inwardly of the first pattern of adhesive and the perimeter of each of the first and second sheets, and the die cut is used to form at least one pocket for a presentation folder, when material is removed from the second sheet.

The adhesive pattern may be a pressure sensitive adhesive, pressure sealable cohesive or other activatable adhesives such as a hot melt, remoistenable or the like. The pattern extends inwardly from the perimeter less than an inch and runs substantially continuously around the perimeter of the sheet to which it has been applied.

In addition, in this and other embodiment, the removable portion may be provided with one or more detachable elements selected from a group including business cards, coupons, advertising collateral, tickets, tags, labels and combinations thereof.

The laminate may also be provided with a second adhesive pattern that is spaced inwardly of the perimeter and first adhesive pattern and is used to create at least a second pocket or other configuration that may be desirable. The second pocket may have a dimension that is substantially equivalent to the first pocket or it may have a dimension that is different than the first pocket dimension that is, the dimension is larger or smaller than that of the first pocket.

In a further embodiment of the present invention a laminate for use in creating an individual presentation folder is described and includes a first sheet that has a front face and a back face, first and second side edges and first and second end edges, with the side edges and the end edges defining a perimeter of the first sheet. The first sheet has at least a first pattern of adhesive disposed substantially adjacent and extending inwardly of the perimeter of the first sheet front face. The first sheet has an area or internal dimension.

In the still presently described embodiment, the laminate includes a second sheet that has a front face and a back face, first and second side edges and first and second end edges with the side edges and end edges defining a perimeter. The second sheet is substantially coextensive with the first sheet and the second sheet back face is adhesively joined to the first sheet front face by the pattern of adhesive. The second sheet has an area or internal dimension that is substantially equal to the area of the first sheet.

The presently described embodiment includes at least a first line of weakness that extends substantially continuously through the second sheet forming a removable portion that has an area. The area of the removable portion is less than the areas of each of the first and second sheets but still generally will comprise at least 50% of the area of each of the sheets. The line of weakness is disposed inwardly of the first pattern of adhesive and the perimeter of each of the first and second sheets. The line of weakness is used to form at least one pocket for a presentation folder, when the removable portion is taken away.

In a yet still further embodiment of the present invention, a method of using a laminate for creating individual presentation folders is described and includes the steps of initially assembling a laminate that has first and second sheets substantially coextensive with one another and secured one to another through a pattern of adhesive extending substantially continuously around a perimeter and extending inwardly of the perimeter of at least one of the first and second sheets. Next, at least one removable portion is created in the laminate second sheet such that the removable portion is entirely contained within the perimeter. Then, at least one of the faces of the first and second sheets of the laminate is imaged or printed with individual or personalized indicia. Finally, the removable portion is removed to create at least one pocket for a presentation folder.

Further steps that may be included in the foregoing embodiment include the creation of one or more detachable elements, once the removable portion has been created. In addition, the laminate after the removable portion has been taken away may then be folded into a presentation folder configuration.

These and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
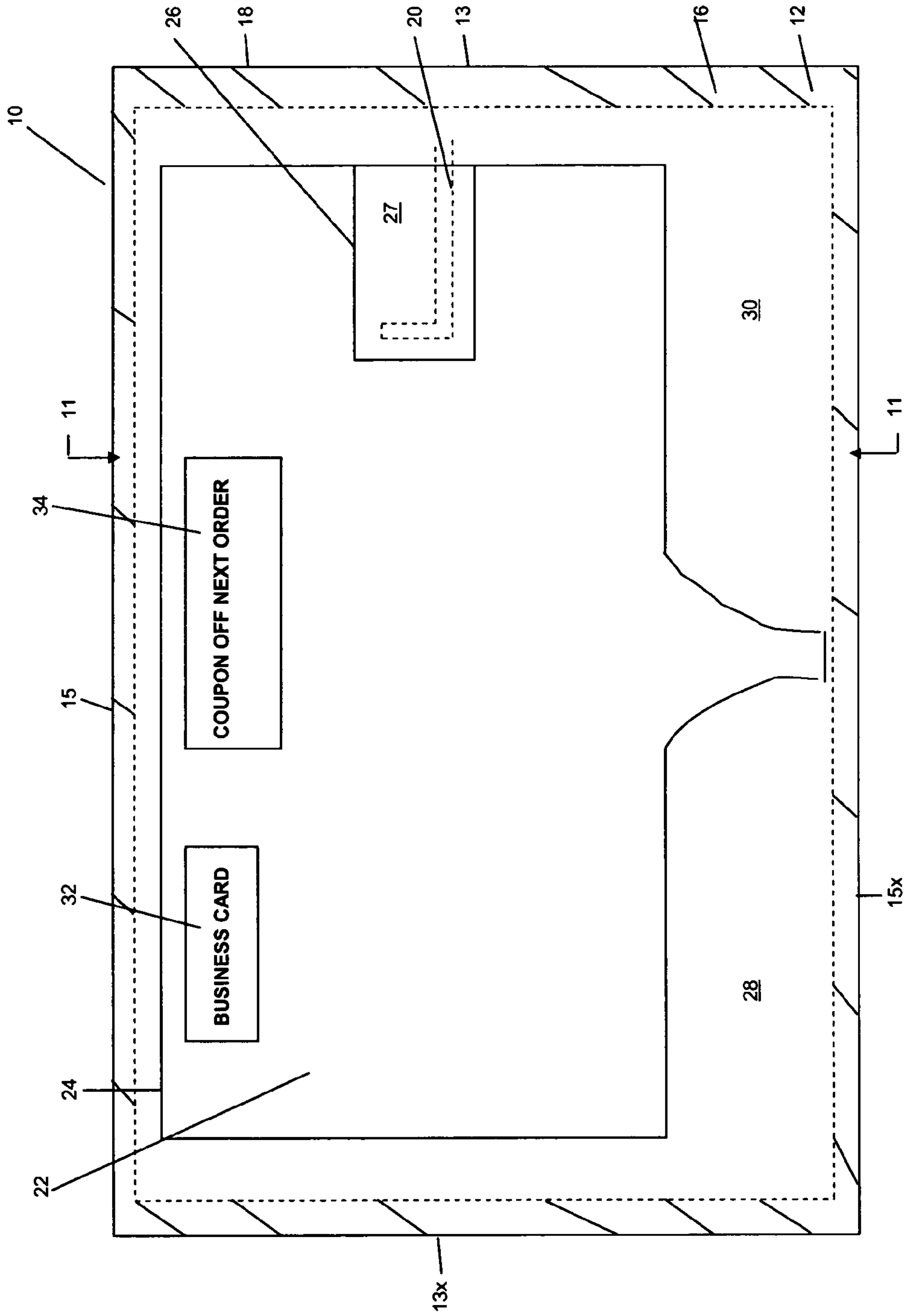
FIG. 1 depicts a front view of the laminate of the present invention showing the adhesive pattern in phantom and die cuts used in forming the pockets of the form construction.

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

Unexpectedly, it has been found that there is not a simple, efficient manner in which to create personalized presentation folders which can be produced in either small quantities, such as by a manufacturer of printed products or a single folder may be produced such as that which may be required by a small office or home office ("SOHO") for presenting products or services or an independent user, such as a student in preparation for a report for school.

As used herein, the term "adhesive pattern" includes, but is not limited to strips, patterns, segments, shapes, spots, continuous arrangements, discontinuous arrangements and combinations thereof. The type of adhesive that may be used includes but is not limited to repositionable, removable, permanent, remoistentable, hot melt, pressure seal (cohesive), cold glues and combinations and mixtures thereof. The present invention may also include adhesive strips that are provided in the form of transfer tapes, pressure sensitive tapes and the like which usually will have a removable release liner, which when removed will expose and/or activate the adhesive that can be used to form a sealing arrangement.

The printing or imaging can be provided on one or both faces of the sheets or laminate. Some level of printing or imaging can also be provided prior to the laminate of the present invention being created. The information to be provided is generally personalized or individualized so that each attendee of a business meeting can receive a specially tailored message. For example, a normal introductory business meeting, the attendees from the target company (company that is being targeted for the sale of goods or services) may have an executive present, members of the sales and marketing team as well as production personnel in attendance to consider the information being provided. The presenter ideally wants to deliver a unique message to each person or group in the audience and is only offered a short period of time to accomplish this task, and usually devotes most of the period to "walking through" a visual presentation. However, through the use of the present invention, the presenter can deliver personalized or individualized information to each member of the group, by individually processing the laminates through a non-impact printer, while still focusing on delivering the information to the group.

In one example, information for sales and marketing may relate to increased sales and commissions or sales strategies for selling the product. Production personnel may receive information relating to efficient manufacturing techniques and other products for which the services may be used with as well as contact numbers for support and other technical data. The executive may only receive summary or overview information and financial numbers relating to the impact of the divisional bottom line. Thus each person is provided with a unique package of information that is tailored to his or her specific talents thereby potentially increasing the chances of success of the presentation. It should be understood that in addition to personalized or individualized information, the sheet or laminate of the present invention may also include static, fixed or regularly repeating information (such as information printed on each folder to be presented).

Each panel of the presentation folder (half of a presentation folder) or folder page will in one exemplary embodiment have a width of approximately 9 inches and a length of about 12 inches. Together, two panels are generally required to create a presentation folder with the overall dimensions running about twelve inches by eighteen inches (12"×18"). The pockets formed from the present invention will have a height of around 4" to 4¼" and a width of up to 9 inches. The laminate of the present invention can be used in creating either single panels or pages for the folders or the laminate may be processed as a full sized sheet, or complete folder which does not require assembly.

In the former, where individual sheets or pages are created, then the user or creator of the presentation folder will then join two pages together by taping such as along a side edge of two laminates.

The foregoing dimensions are used when preparing a standard configuration presentation folder. That is, each panel of the blank runs about 12" high and about 9" wide with the pocket having a length of about 9" and a height of around 4". Obviously, other dimensions are possible and would simply require the repositioning of the adhesive areas, lines of weakness, etc. on the sheet or the use of different sized sheets of material. The pocket of the presently described embodiment is sized and configured so that it can receive and retain a standard size sheet of paper in a portrait arrangement (8½" side placed in the pocket which has a width of approximately 9").

Turning now to FIG. 1, a front elevation or view of the present invention is provided and the laminate is generally referred to by reference numeral 10. The laminate includes a top and bottom sheet 12 and 14 (see FIG. 2 for the bottom sheet) that are secured together by at least a first pattern of adhesive 16 shown through use of phantom lines in FIG. 1 that extend about the construction inwardly of the perimeter of the sheet. The pattern of adhesive 16 extends inwardly from a perimeter 18 of the laminate. It should be understood that each of the sheets has a top and bottom face, side edges 13 and 13* and end edges 15 and 15*. The adhesive pattern 16 extends inwardly from the perimeter 18 an amount that is generally less than one inch and more preferably less than ¾ of an inch. The area of folder space consumed by the adhesive pattern can limit the size of the opening of the pocket, as such, the adhesive pattern should only be sufficient to effectively seal the sheets to one to another.

Sheets 12 and 14 are generally selected from cellulosic based material, but other materials such as films (metalized or plastic) can be used. The stock of the present invention is selected from a group ranging from approximately 20 pound bond to 100 pound tag or card stock with about 80 pound tag stock being generally preferred. The stock should be generally capable of receiving printing or imaging such as that which may be acquired from a non-impact printer (laser or ink jet).

The laminate 10 may also be provided with a second adhesive pattern 20 which can be used in forming additional pockets in the assembly, such as for holding business cards, coupons, diskettes and the like. Generally, the second adhesive pattern 20 is disposed inwardly of the first adhesive pattern 18 and as depicted in FIG. 1, the second adhesive pattern 20 has a generally "L" shaped configuration and cooperates with the first adhesive pattern 18 to create the pocket. The second adhesive pattern 20 may however be positioned anywhere in the laminate depending upon the configuration being offered by the manufacturer or requested by the customer.

The laminate 10 is provided with a removable portion 22 that is created through the use of a die cut 24 in this particular embodiment. The die cut 24 is generally continuous and extends inwardly of the adhesive pattern 18. The die cut 24 is shown as generally creating an outline for a two pocket folder and has a rough "V" like shape, which defines the area between the pockets being created. The remainder of the removable portion or portion of the second sheet or top sheet of the laminate defines generally the internal area of the folder and exposes a substantial portion of the first face of the first sheet. As provided in FIG. 1, a second die cut 26 may be provided to facilitate the creation of an additional pocket 27 where a second adhesive pattern 20 is used.

As can be seen from FIG. 1, the die cut 24 forms first and second pockets 28 and 30, respectively. The pockets will generally be sealed along the sides and edges 15* and 13 and 13* by use of the first adhesive pattern 18 to create left and right opening pockets that will hold inserts such as documents.

FIG. 1 also shows additional detachable elements 32 and 34 which may be formed in the removable portion 22 through additional die cuts. As depicted in FIG. 1, the detachable elements are a business card and coupon, such as for a discount off the next order of products or services from the presenter. However, the detachable elements may be any suitable item such as advertising collateral, tickets, tags, labels and combinations thereof.

Figure 2:
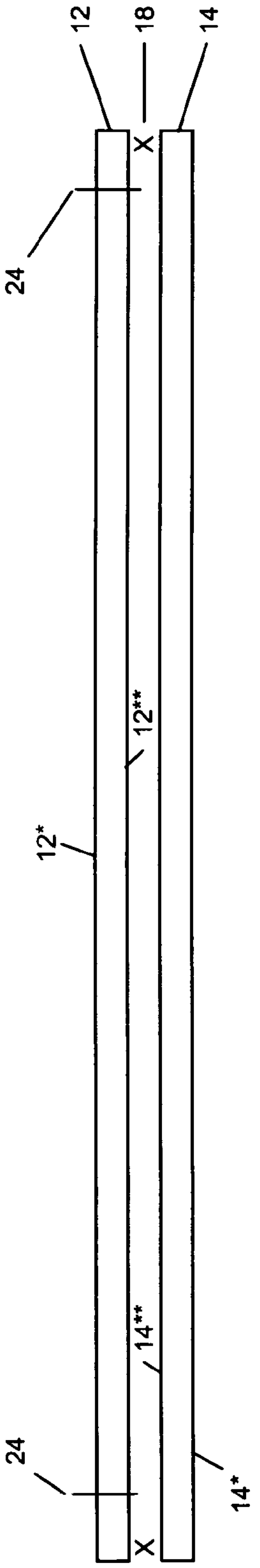
FIG. 2 provides a cross section showing the first and second sheets of the laminate as well as the adhesive pattern holding the laminate together taken along line 11 in FIG. 1.

Turning now to FIG. 2, the top sheet 12 has first and second faces or top and bottom faces 12* and 12 and the bottom sheet 14 has first and second faces or top and bottom faces 14* and 14**. The first adhesive pattern 18 secures the first or top face 14** of the first or bottom sheet 14 to the second or bottom face 12** of the top or second sheet 12. Also shown in FIG. 2 are die cuts 24 which are shown as extending through the sheet 12 so as to create the removable section shown in FIG. 1**.

Figure 3:
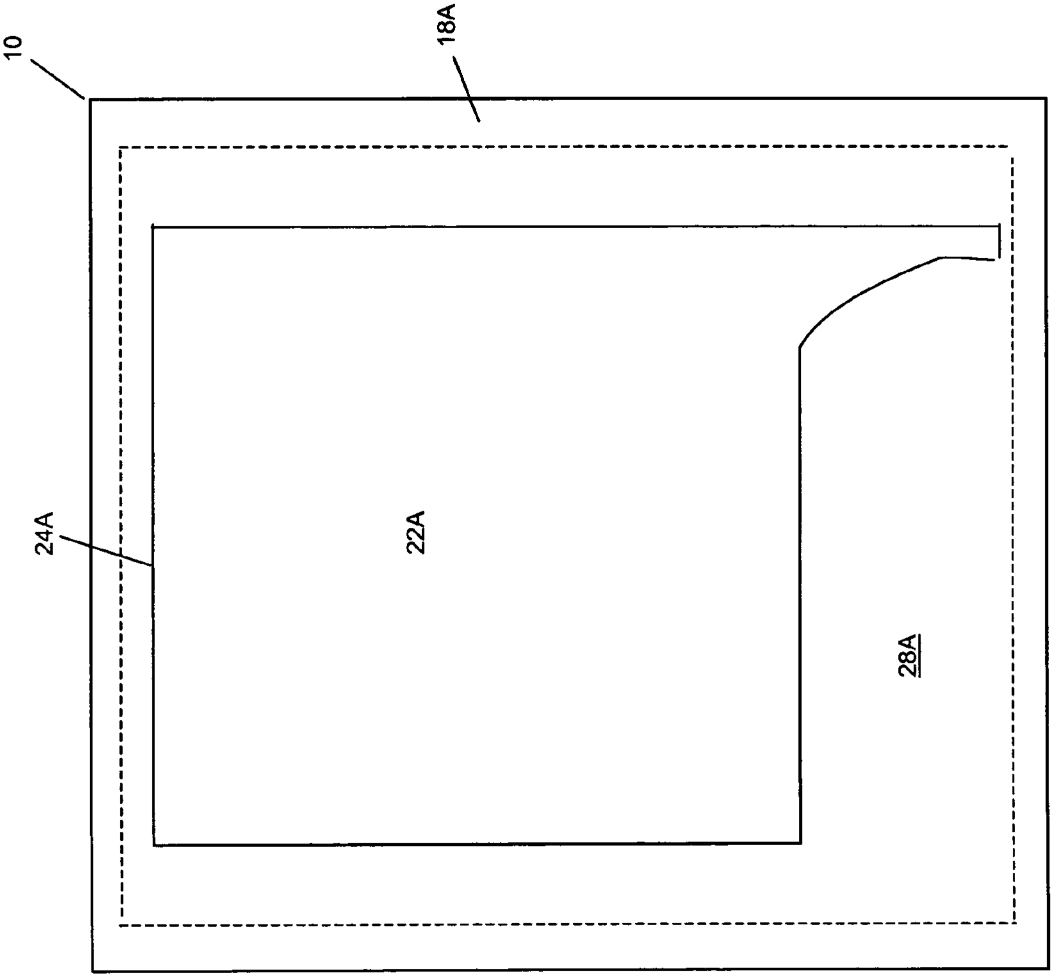
FIG. 3 illustrates the laminate of the present invention utilized in forming a single page or panel of the individual folder and showing a right hand pocket orientation.
Figure 3A:
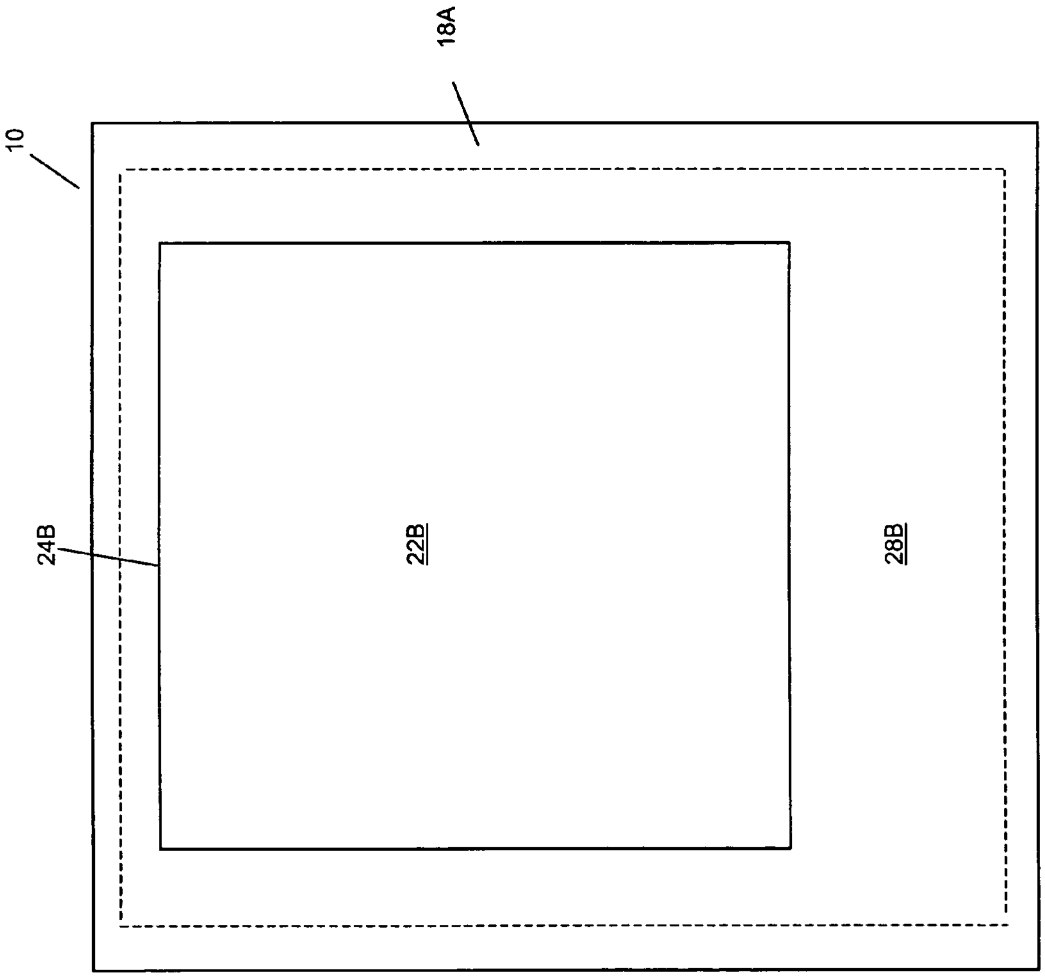
FIG. 3A shows a further embodiment of the laminate of the present invention being used to create a single page or panel in which there is no particular orientation to the pocket opening.
Figure 3B:
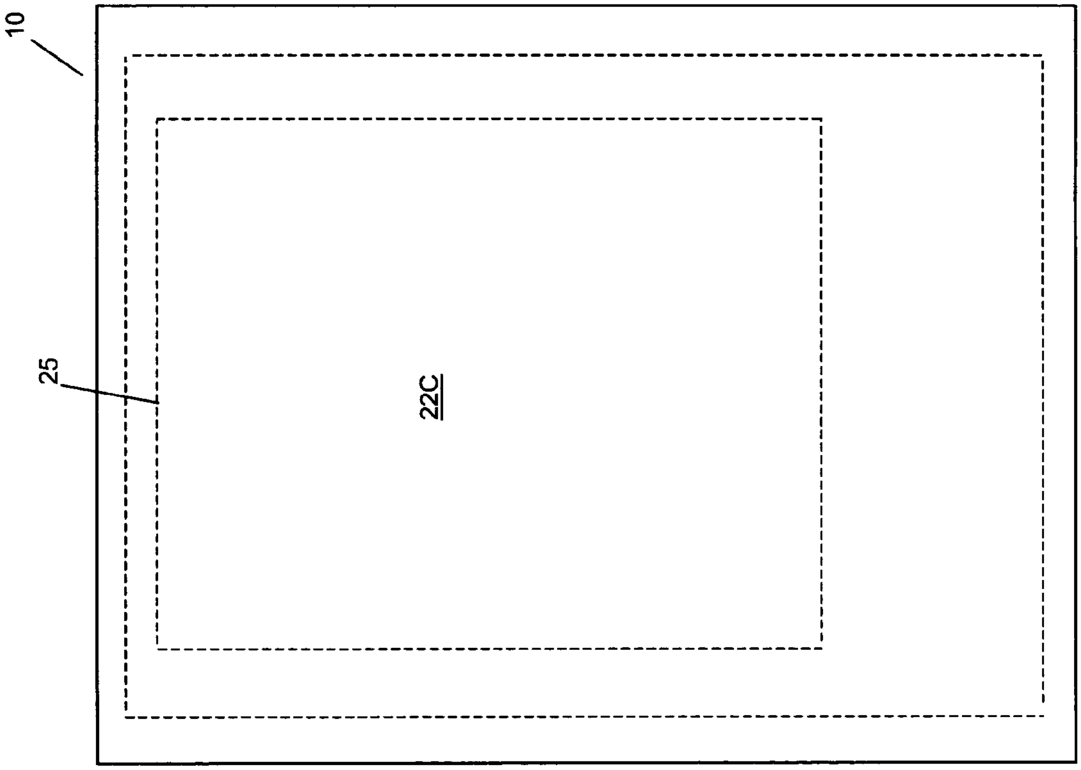
FIG. 3B provides a further embodiment in which the removable portion of the laminate is provided with a line of weakness.

FIGS. 3 through 3B show variations of the laminate of the present invention. Again, the laminate is referred to generally by reference numeral 10. In FIG. 3, the first adhesive pattern 18A is shown in phantom securing the first and second sheets one to another. Removable portion 22A is created through the use of die cut 24A which is used to create a pocket having a right hand orientation 28A. It should be understood that the die cut 24A could be used to create either a right hand or left hand orientation of the pocket opening.

FIG. 3A shows the laminate 10 having die cut 24B that is used to create removable section 22B. In this embodiment the removable section is substantially quadrate and creates a pocket 28B with no open edge.

FIG. 3B provides a still further embodiment of the present invention in which the laminate 10 has been provided with a line of weakness 25, such as a line of perforation having a series of cuts and ties. The line of weakness extends substantially continuously around the removable section or portion 22C so that the removable portion can be readily removed.

Figure 4:
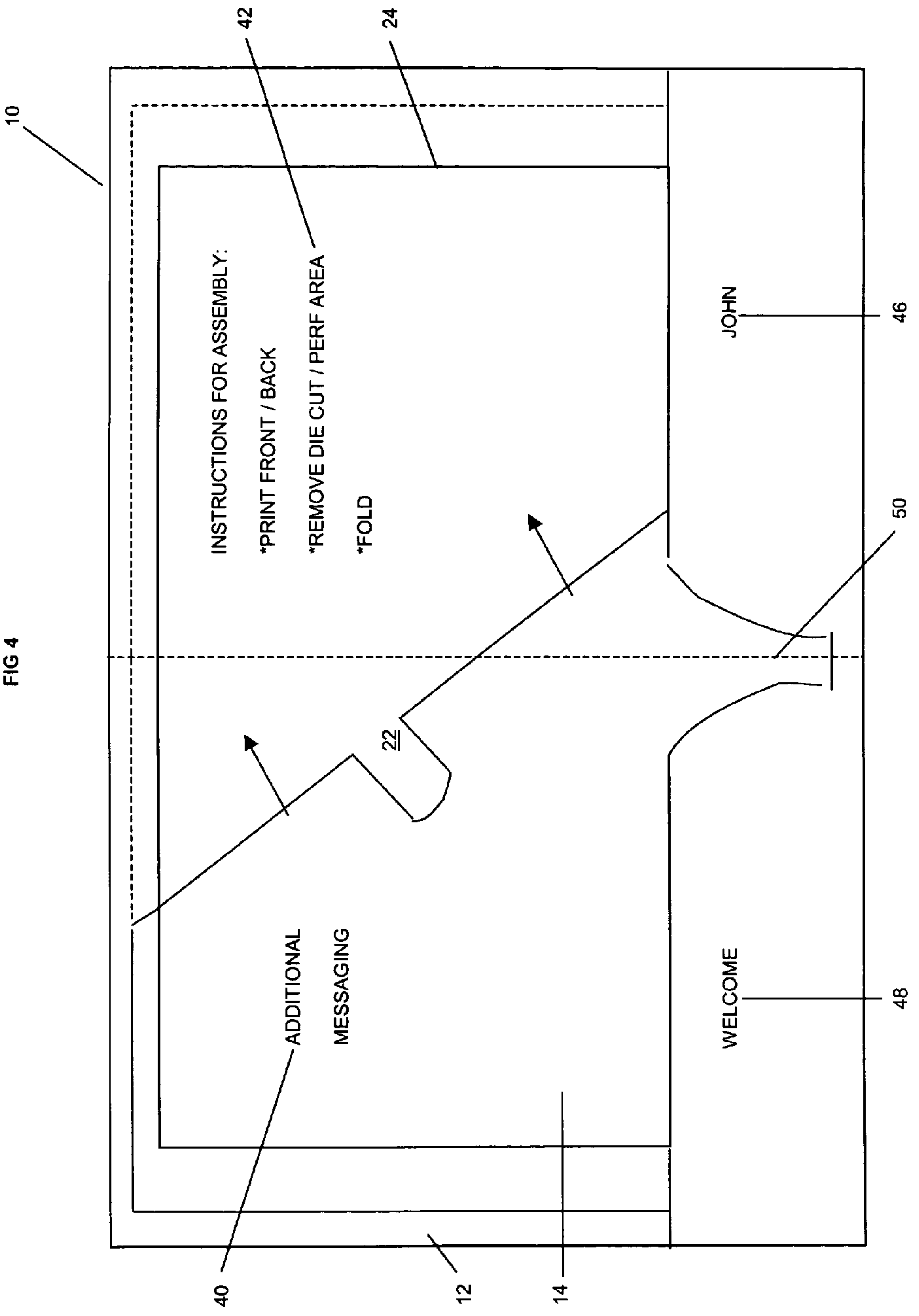
FIG. 4 depicts the removable portion being removed from the laminate of the present invention.

Reference is now directed to FIG. 4 in which a front view of the laminate is provided and showing the removable portion being pulled away from the laminate to create the presentation folder. The laminate 10 is shown with the perimeter of the top sheet 12 held in place by the first adhesive pattern. The removable portion 22 is peeled away via die cut 24 so as to reveal the first face of the bottom sheet 14. As shown in FIG. 4, removal of the removable section 22 may then reveal additional messaging 40 that may have been added by the manufacturer prior to the creation of the laminate. In this way, the use of available "real estate" is maximized by the consumer or end user so that additional information about a product or service can be revealed to the recipient by the presenter.

FIG. 4 also shows that the top face of the top sheet 12 is provided with indicia 42 that can be related to instructions for using the form after it has been received by the customer or presenter. In addition, the laminate 10 is also provided with other areas of personalized indicia 46 and 48, here shown on the areas that will serve as the pockets for the presentation folder. The pockets are created from the remainder of the top sheet, the portion left outside the die cut or that portion that is not removed by the removable section. Also shown in FIG. 4 is a score line or line of demarcation which is used to assist in the folding of the laminate 10 so as to complete the process of forming the presentation folder of the present invention.

Figure 5:
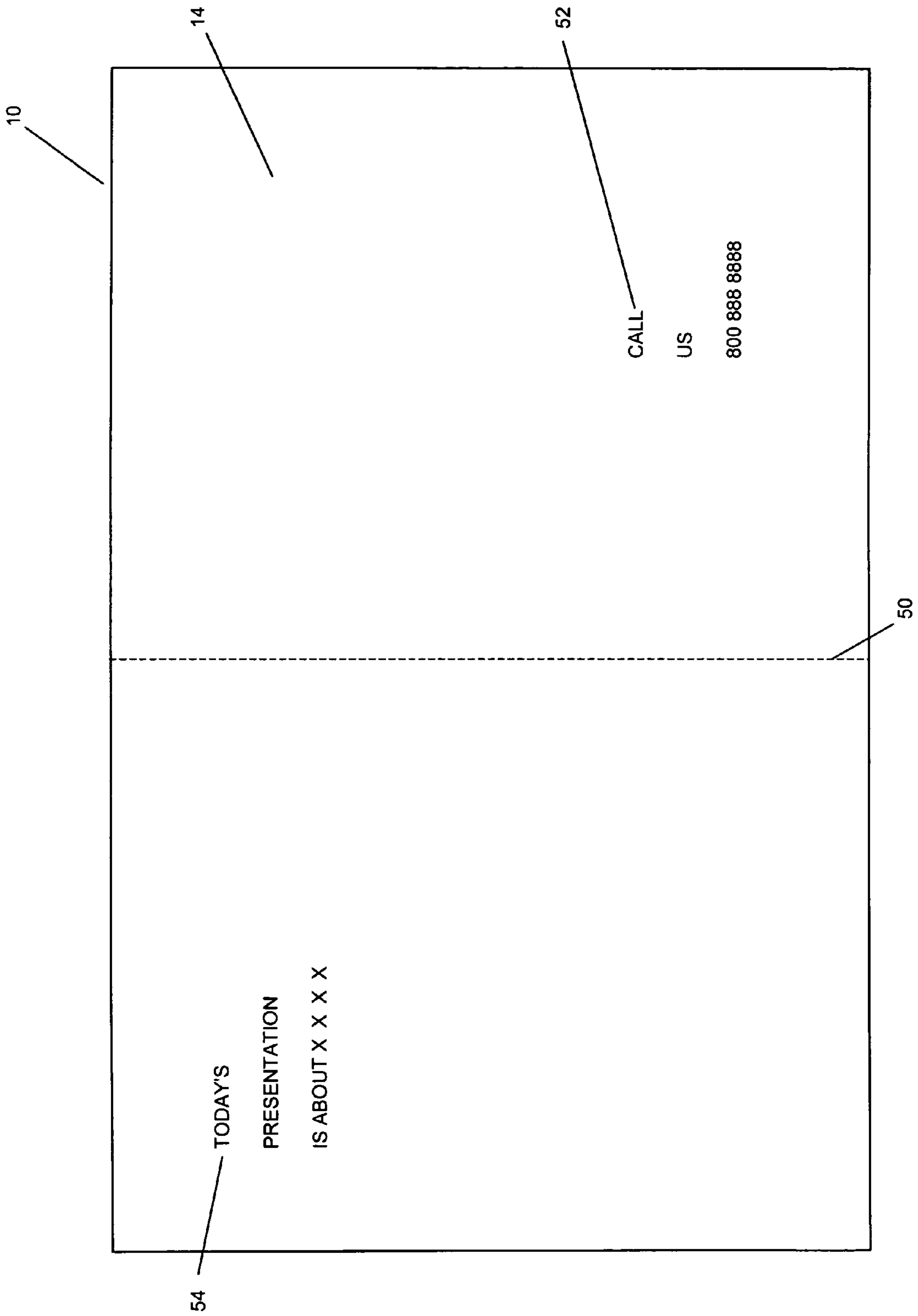
FIG. 5 illustrates the back face of the first sheet of the present invention showing personalized imaging on the folder.

FIG. 5 shows the back face of the bottom sheet 14. The face has been imaged or printed with variable indicia shown at 52 and 54. The printing or imaging can be accomplished by the manufacturer or by the end user customer such as by running the laminate through a desktop non-impact printer, e.g. laser or ink-jet printer. The panels are separated by a medial line of weakness or fold line 50. It should be understood that the foregoing embodiments while depicting a laminate in a two wide orientation, that is first and second pocketed panels in an adjacent configuration, the invention is not so limited and the laminate may only be a single width such as that provided in FIGS. 3 through 3B.

Figure 6:
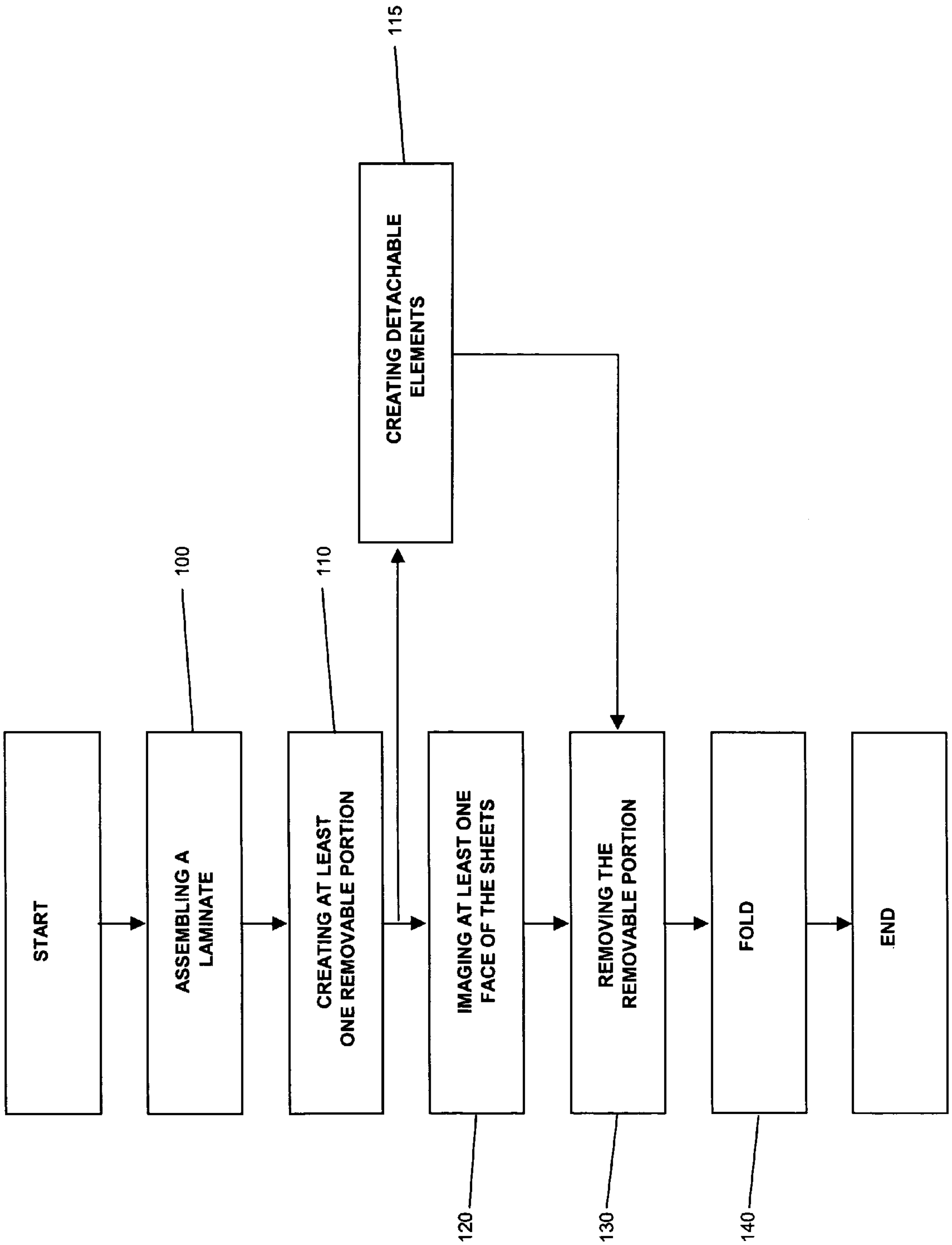
FIG. 6 provides a block diagram of the present invention showing an exemplary method of using the construction.

FIG. 6 illustrates a block diagram setting forth an exemplary method of practicing the present invention. The process is started by first assembling a laminate at step 100. The assembly of the laminate includes the selection of suitable stock of material such as a cellulosic stock, ranging between 20 pound bond to 100 pound tag stock, with 80 pound being generally preferred. Two sheets, having similar sizes or dimensions are secured one to another through the use of a pattern of adhesive. The adhesive will preferably be a permanent adhesive to prevent the sheets from delaminating. Suitable adhesives include rubber based or acrylic adhesives applied via a hot melt or emulsion process. The patterns are created by screens although other methods may be used such as slot dies, Meyer rods and the like.

Next, at least one removable section is created at step 110. Creation of the removable section can be accomplished through use of die to create cuts or perforation lines or lines of weakness, depending on the type of product that is desirably produced. If desirable, additional detachable elements, cards, tags, coupons, etc. can be created at step 115 through the use of subsequent die cutting or perforating operations.

After the removable section and optional detachable elements are created at step 110 and 115, respectively, then the laminate can be imaged or printed at step 120. At this particular time, the imaging can be provided on the front face of the top sheet or the back face of the bottom sheet. Additional printing could have been performed prior to the manufacture of the laminate.

If printing is provided on the front face of the top sheet, it will generally be limited to those areas where the pockets will be produced. That is, those sections of the assembly that will remain after the removable portions have been taken away from the laminate. The printing on the back face of the bottom sheet may occur anywhere on the available surface. Printing or imaging will generally be easier which the laminate remains in tact as the laminate is generally, substantially planar in configuration enabling the laminate to be easily fed through a non-impact printer.

Next, after the printing or imaging has been completed, the removable sections are pulled away at step 130. This will then reveal the generally complete structure of the presentation folder, namely the exposed pockets.

To complete the construction, the presentation folder is then folded about a central or medial fold line as previously described herein at step 140. Then the process is completed and the presentation folders is used or distributed.

Figure 7:
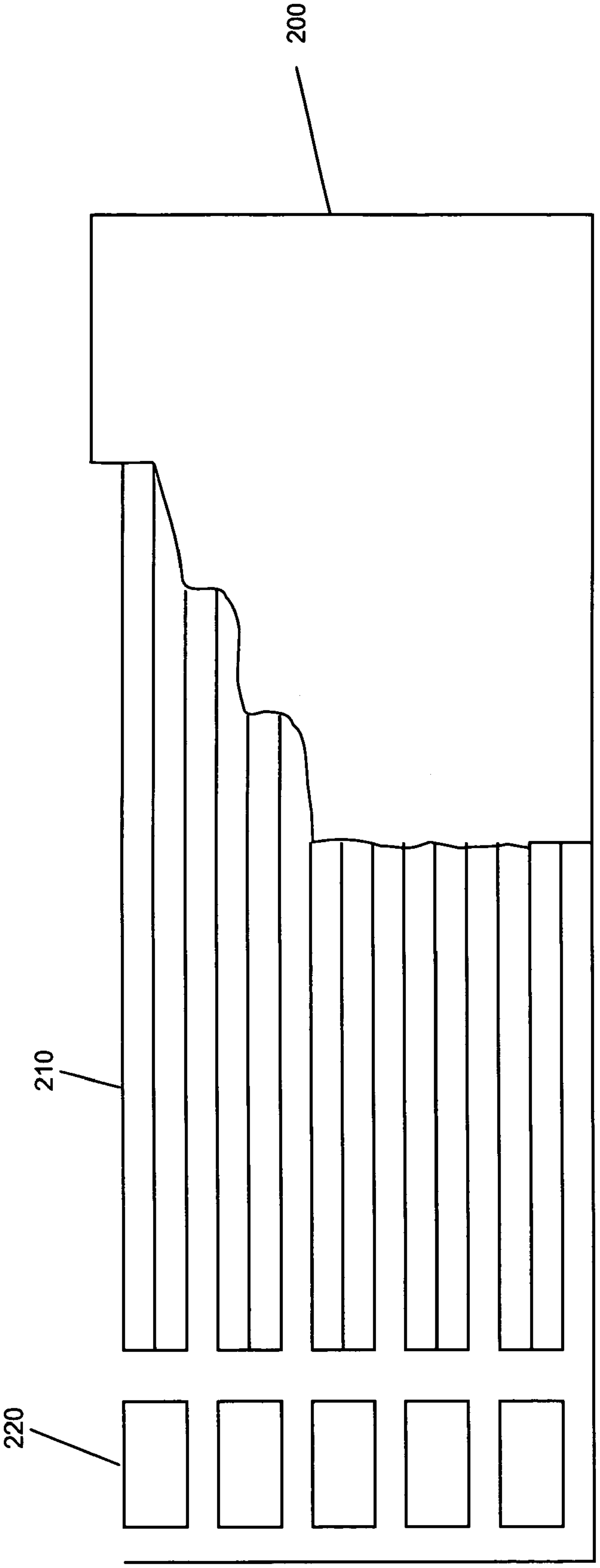
FIG. 7 shows a package having several laminates used in creating presentation folders.

Turning now to FIG. 7, a package of laminates constructed in accordance with the present invention is now described. The package 200 may be any suitable package such as paperboard, cardboard, plastic or paper wraps or the like. The package 200 contains anywhere from one to several laminates 210. The laminates 210 may either be used in forming single panels or pages for a presentation folder or may be a two wide arrangement. That is, if a single panel is provided the dimensions, as described above will be roughly 9" by 12" whereas if a two wide arrangement is provided the dimensions will be roughly 18" by 12". If the package 200 contains a single panel laminate then strips of adhesive material 220 may also be included. The adhesive material may be transfer tape or the like which would be used to attach one panel to another in a sided by side configuration. By providing single wide laminates, then the folders can easily be constructed in SOHO applications and individual use.

Figure 8:
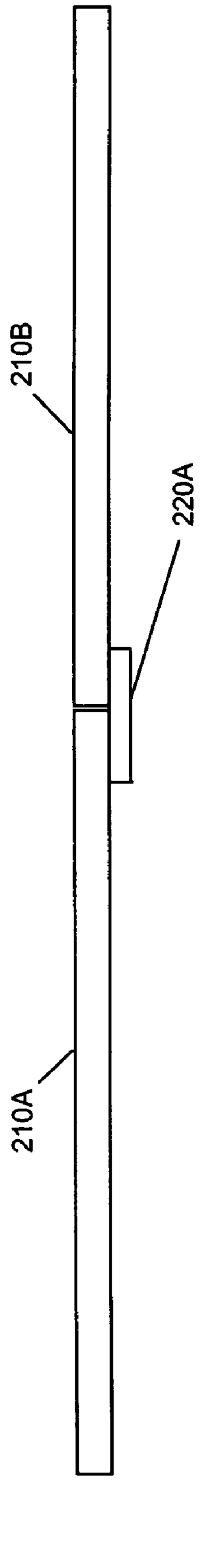
FIG. 8 depicts two laminate panels joined together to form a presentation folder.

FIG. 8 shows one possible application of the package described in connection with FIG. 7. Here laminate panels or sheets 210A and 210B are joined to one another by adhesive tape 220A to create a presentation folder.

It will thus be seen according to the present invention a highly advantageous laminate for use in creating presentation folders has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A laminate for use in creating presentation folders, comprising;

a first sheet having a front face and a back face, first and second side edges and first and second end edges, said side edges and said end edges defining a perimeter, said first sheet having at least a first pattern of adhesive disposed substantially adjacent to and extending inwardly from said perimeter of said first sheet front face and said first sheet having an area;

a second sheet having a front face and a back face, first and second side edges and first and second end edges, said side edges and end edges defining a perimeter, said second sheet is substantially coextensive with said first sheet and said second sheet back face is adhesively joined to said first sheet front face by said pattern of adhesive and said second sheet having an area substantially equal to said area of said first sheet; and at least one die cut extending through said second sheet forming a removable portion having an area, said area of said removable portion is less than said areas of each of said first and second sheets, said die cut disposed inwardly of said first pattern of adhesive and said perimeter of each of said first and second sheets, and said die cut forming at least one pocket in a presentation folder.

2. A laminate as recited in claim 1, wherein said first sheet includes at least a second pattern of pressure sensitive adhesive, said second pattern disposed inwardly of said first pattern.

3. A laminate as recited in claim 2, wherein said second pattern of adhesive is used in forming a pocket.

4. A laminate as recited in claim 1, wherein said first pattern of adhesive is pressure sealable cohesive.

5. A laminate as recited in claim 1, wherein said first pattern of adhesive is a pressure sensitive adhesive.

6. A laminate as recited in claim 1, wherein said first pattern of adhesive extends inwardly of said perimeter of said first sheet a distance of less than one inch.

7. A laminate as recited in claim 1, wherein second sheet includes a second die cut formed therein to create a second pocket.

8. A laminate as recited in claim 1, wherein said laminate can be processed through a non-impact printer.

9. A laminate as recited in claim 1, wherein said laminate is substantially planar.

10. A laminate as recited in claim 1, wherein said removable portion contains at least one detachable element die cut from said removable portion.

11. A laminate as recited in claim 10, wherein said at least one detachable element is selected from a group including business cards, coupons, advertising collateral, tickets, tags, labels and combinations thereof.

12. A laminate for use in creating an individual presentation folder, comprising;

a first sheet having a front face and a back face, first and second side edges and first and second end edges, said side edges and said end edges defining a perimeter, said first sheet having at least a first pattern of adhesive disposed substantially adjacent to and extending inwardly from said perimeter of said first sheet front face and said first sheet having an area;

a second sheet having a front face and a back face, first and second side edges and first and second end edges, said side edges and end edges defining a perimeter, said second sheet is substantially coextensive with said first sheet and said second sheet back face is adhesively joined to said first sheet front face by said pattern of adhesive and said second sheet having an area substantially equal to said area of said first sheet; and at least a first line of weakness extending substantially continuously through said second sheet forming a removable portion having an area, said area of said removable portion is less than said areas of each of said first and second sheets, said line of weakness is disposed inwardly of said first pattern of adhesive and said perimeter of each of said first and second sheets, and said line of weakness forming at least one pocket in a presentation folder.

13. A laminate as recited in claim 12, wherein said line of weakness is a perforation having one or more cuts and one or more ties.

14. A laminate as recited in claim 12, wherein said laminate is generally substantially planar such that said laminate can be processed through a non-impact printer.

15. A laminate as recited in claim 12, wherein said second sheet has a second line of weakness defining at least a second pocket.

16. A laminate as recited in claim 12, wherein said removable portion contains at least one detachable element.

17. A laminate as recited in claim 12, wherein said at least one detachable element is selected from a group including business cards, coupons, advertising collateral, tickets, tags, labels and combinations thereof.

* * * * *